(12) United States Patent
Lee et al.

(10) Patent No.: US 8,506,807 B2
(45) Date of Patent: Aug. 13, 2013

(54) SPIRAL WOUND TYPE FILTER CARTRIDGE

(75) Inventors: Sun-Yong Lee, Seoul (KR); Doo-Won Han, Seoul (KR); Youn-Kook Kim, Seoul (KR); Hyoung-Jun Ahn, Seoul (KR); Eu-Jean Moon, Seoul (KR); Suk-Young Lee, Seoul (KR)

(73) Assignee: Woongjincoway Co., Ltd. (KR)

( * ) Notice: Subject to any disclaimer, the term of this patent is extended or adjusted under 35 U.S.C. 154(b) by 393 days.

(21) Appl. No.: 12/991,840

(22) PCT Filed: Dec. 18, 2008

(86) PCT No.: PCT/KR2008/007513
§ 371 (c)(1),
(2), (4) Date: Nov. 9, 2010

(87) PCT Pub. No.: WO2009/139531
PCT Pub. Date: Nov. 19, 2009

(65) Prior Publication Data
US 2011/0062076 A1    Mar. 17, 2011

(30) Foreign Application Priority Data
May 15, 2008  (KR) .................. 10-2008-0045015

(51) Int. Cl.
*B01D 63/10*    (2006.01)
*B01D 27/00*    (2006.01)
*B01D 24/00*    (2006.01)

(52) U.S. Cl.
USPC ............... 210/321.74; 210/321.83; 210/435; 210/483; 210/488; 210/489; 210/490; 210/493.4; 210/497.1; 210/499; 210/502.1; 210/503; 210/505

(58) Field of Classification Search
USPC ............... 210/321.74, 321.83, 433.1, 435, 210/483, 488, 489, 490, 493.4, 497.1, 499, 210/502.1, 503, 505
See application file for complete search history.

(56) References Cited

U.S. PATENT DOCUMENTS

| 5,897,779 | A  | * | 4/1999 | Wisted et al. ................. 210/651 |
| 6,550,622 | B2 | * | 4/2003 | Koslow ........................... 210/490 |
| 7,645,312 | B2 | * | 1/2010 | Hamlin et al. .................. 55/498 |

FOREIGN PATENT DOCUMENTS

| KR | 10-2000-0021020 | 4/2000 |
| KR | 10-2001-0097630 | 8/2001 |
| KR | 10-2004-0054833 | 6/2004 |
| WO | 95/21674 | 8/1995 |

OTHER PUBLICATIONS

International Search Report—PCT/KR2008/007513 dated Aug. 11, 2009.
Written Opinion—PCT/KR2008/007513 dated Aug. 11, 2009.

* cited by examiner

*Primary Examiner* — John Kim
(74) *Attorney, Agent, or Firm* — Cantor Colburn LLP

(57) ABSTRACT

Disclosed herein is a spiral wound type filter cartridge and more specifically, a spiral wound type filter cartridge in which activated carbon fiber is provided. The inside of spiral wound type filter cartridge is capable of serving as a carbon filter in a water purifier, thus eliminating the necessity of the use of any carbon filter for pre- or post-treatment in the process of purifying raw water, reducing an overall size of the water purifier and considerably reducing costs associated therewith.

33 Claims, 5 Drawing Sheets

SPIRAL WOUND TYPE FILTER CARTRIDGE

TECHNICAL FIELD

The present invention relates to a spiral wound type filter cartridge. More specifically, the present invention relates to a spiral wound type filter cartridge, inside thereof capable of serving as a carbon filter in a water purifier, thus eliminating the necessity of the use of any carbon filter for pre- or post-treatment in the process of purifying raw water, decreasing an overall size of the water purifier and considerably reducing costs associated therewith.

BACKGROUND ART

With recent economic development, the expansion of industrial scale and the concentration of big cities and factories have brought about a great increase in environmental contamination. As a result, water pollution has become a serious problem and drinking water is inevitablely purified through a water purifier prior to use. A water purifier is necessarily provided with a filter to filter raw water and the filter may be selected from a variety of water-purifying filters including non-woven fabric, activated carbon, activated carbon fiber (ACF), hollow fiber membrane, ion exchange resin and reverse osmosis filters, depending on the filtering method and steps.

As another conventionally used filter, a spiral wound type filter cartridge is suggested, which is disclosed in detail in Korean Patent No. 10-0477585, entitled "Method for preparing spiral wound type separation membrane module".

The spiral wound type filter cartridge is generally moduled in a spiral wound shape using a flat-sheet type of ultrafiltration, nanofiltration or reverse osmosis membranes. In particular, ultrafiltration or reverse osmosis membranes utilize a partial filtration mode and are thus known to be highly resistant to contamination, compared to filtration modes of hollow fiber membranes, because a portion of introduced water containing concentrated contaminants is discharged to a concentrated-water discharge line. In addition, flat-sheet membranes used for spiral-wound type modules are characterized in that they are coated on a non-woven fabric and are thus more stable to operate at high pressures, as compared to hollow fiber membranes, and have a maximum efficient area for a constant volume. Meanwhile, nanofiltration and reverse osmosis membranes generally used as spiral wound type filter cartridges are capable of removing materials harmful to the human body, for example, waste such as iron or rust, microorganisms and heavy metal ions and are thus widely utilized not only in household water-purifier filter cartridges water but also in industrial water-purifier modules.

The spiral wound type filter cartridge comprises: a filter tube provided with a purified-water outlet on one side thereof and a plurality of water inlet holes in a longitudinal direction on the outside thereof and being in the form of a pipe; a filtering sheet repeatedly wound on the filter tube in the form of a roll, while being fixed on the one side of the filter tube under the condition that the one surface of a membrane sheet is closely adhered to a mesh sheet; and an adhesive sheet adhered to the filtering sheet such that the filtering sheet takes the circular housing appearance, while being wound on the filter tube, and is joined to a case provided with raw water inlet holes such that a purified water outlet is exposed to the outside.

When a purified-water inlet holes of filter tube is seen from the top in a longitudinal direction, the filtering sheet has a structure wherein both sides of the filtering sheet and bottom of the filter tube are closed by adhesion to take an envelope shape, the membrane sheet arranged at both sides has an inner structure wound in a spiral shape while including a mesh sheet for membrane providing a water channel, allowing purified water to flow to a filter tube, and the appearance thereof is wound to maintain the spiral wound state.

The spiral wound type filter cartridge is installed in an appliance such as a water purifier and carbon filters are provided in an inlet through which raw water enters and in an outlet through which purified water is discharged. Thus, the spiral wound type filter cartridge, together with the two carbon filters, sequentially filters the raw water.

The reason for providing carbon filters in the spiral wound type cartridge in pre- and post-treatment processes is that the spiral wound type filter cartridges can filter particulate materials, microorganisms or toxic minerals, but, of these, in particular, polyamide composite membranes have disadvantageously poor resistance to materials such as chlorine residues, and carbon filters are capable of efficiently removing contaminants such as organic chemicals or offensive odors.

Furthermore, the carbon filters are made of particulate activated carbon composed of materials such as wood, coconut or coal particles specifically heat-treated in order to provide several million fine holes, or of activated carbon fibers prepared by carbonizing fibers, and are used to remove various chemical contaminants. In particular, the carbon filters are effective in removing organic chemicals such as insecticides, weedicides or industrial waste and radon, chlorine and offensive odor thereof and are thus necessarily provided in a filtering area. However, the carbon filters disadvantageously cannot remove microorganisms or toxic minerals.

Accordingly, when spiral wound type filter cartridges or carbon filters are applied to water purifiers, the use of additional carbon filters is inevitably required for the process of pre- or post-treating the filter cartridges, thus disadvantageously incurring costs required for securing a sufficient area of the water purifiers and for installing the carbon filters.

DISCLOSURE OF INVENTION

Technical Problem

Therefore, the present invention has been made in view of the above problems, and it is an object of the present invention to provide a spiral wound type filter cartridge, inside of which is capable of serving as a carbon filter in a water purifier, thus eliminating the necessity of the use of any carbon filter for pre- or post-treatment in the process of purifying raw water.

Technical Solution

In accordance with one aspect of the present invention for achieving the above objects, there is provided a spiral wound type filter cartridge, including: a filter tube provided with a purified-water outlet on one side thereof, the filter tube provided with a plurality of water inlet holes in a longitudinal direction on the outside thereof, the filter tube being in the form of a pipe; a filtering sheet comprising a membrane sheet composed of a two-fold sheet to provide a filter area therein and provided with a mesh sheet for membrane, and a mesh sheet provided with a channel and laminated on one or both surfaces of the membrane sheet, the filtering sheet being repeatedly wound on the filter tube in the form of a roll, while being fixed on the one side of the filter tube; an activated carbon fiber provided in the channel of the filtering sheet or inside the filter tube; and an adhesive sheet adhered to the filtering sheet such that the filtering sheet takes the circular housing appearance, while being wound on the filter tube.

When the activated carbon fiber is provided in the channel of the filtering sheet, it may be provided on one or both sides of the mesh sheet for membrane or the mesh sheet.

The activated carbon fiber may be in the form of a felt, non-woven fabric or paper and may be integrally adhesive-bonded to one or all of the mesh sheet for membrane, the mesh sheet and inside the filter tube.

The activated carbon fiber may be composed of an activated carbon fiber sheet and may be provided in one or both surfaces of at least one of the mesh sheet for membrane and the mesh sheet.

The activated carbon fiber sheet may be impregnated or woven from fiber yarns.

Advantageous Effects

The inside of spiral wound type filter cartridge of the present invention is capable of serving as a carbon filter in a water purifier, thus eliminating the necessity of the use of any carbon filter for pre- or post-treatment in the process of purifying raw water, decreasing an overall size of the water purifier and considerably reducing costs associated therewith.

In addition, the activated carbon fiber is introduced in a spiral shape into the spiral wound type filter, thus increasing contact efficiency of treated water, improving the efficiency of the activated carbon fiber, and imparting desired functions to the activated carbon fiber through treatment of high-porosity activated carbon fiber with antibacterials or germicides.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
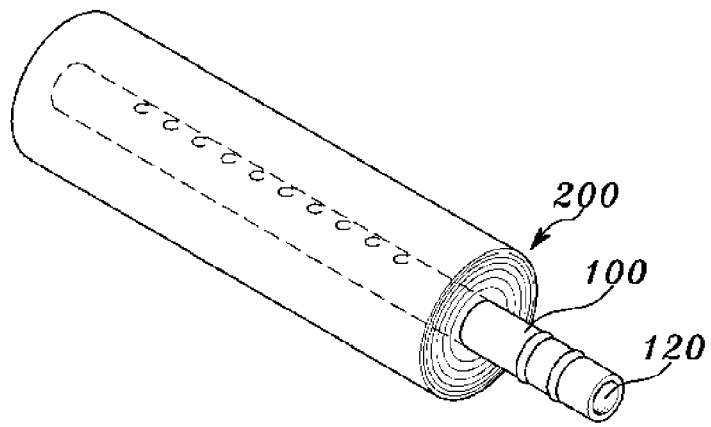
FIG. 1 is a perspective view illustrating a spiral wound type filter cartridge according to the present invention.
Figure 2:
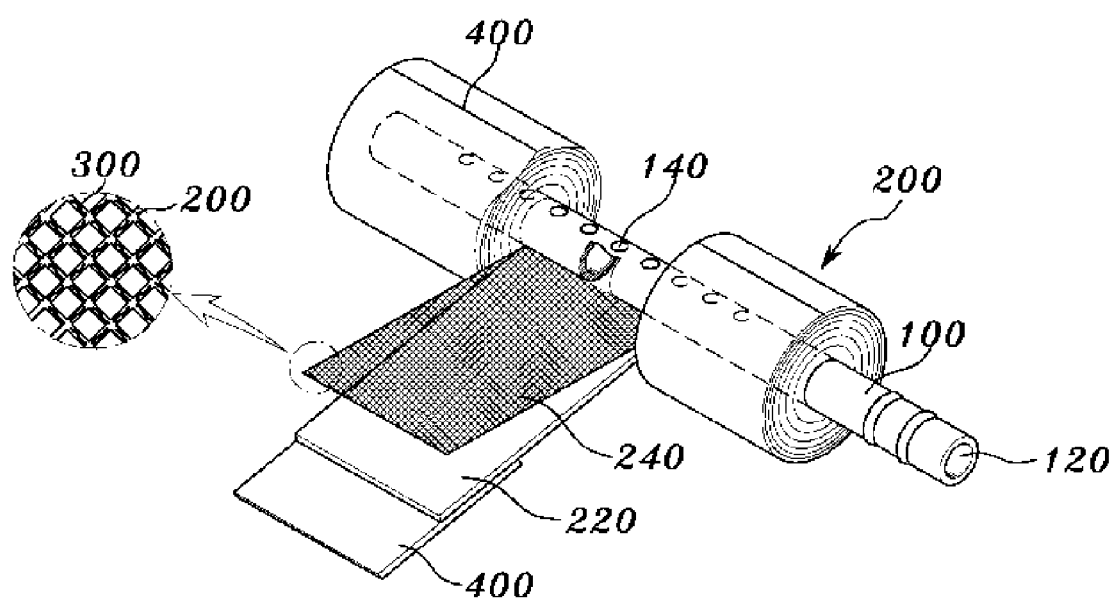
FIG. 2 is an exploded perspective view illustrating a principal part of the filter cartridge of FIG. 1.
Figure 3:
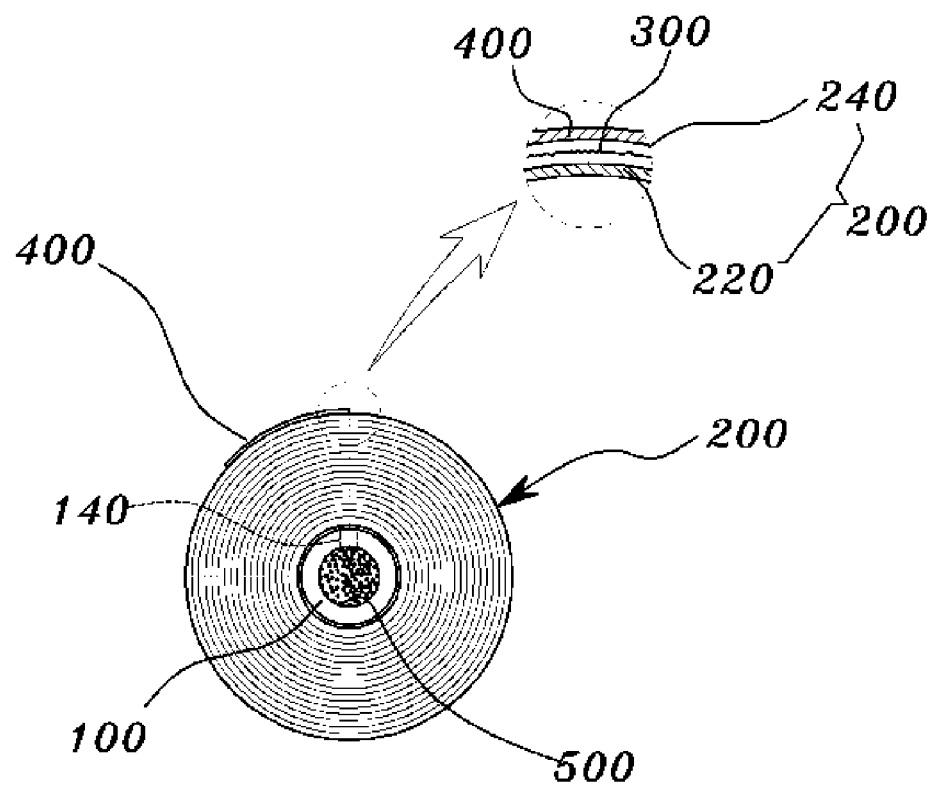
FIG. 3 is an enlarged view illustrating a longitudinal cross-section of the filter cartridge of FIG. 1 or 2.
Figure 4:
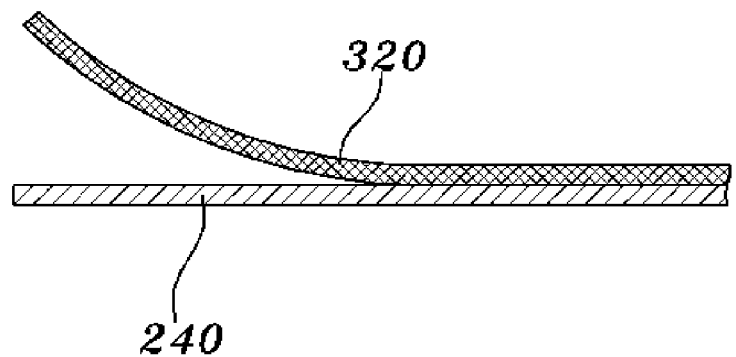
FIG. 4 is a sectional view illustrating a state in which an activated carbon filter sheet is applied according to another embodiment of the present invention.

Hereinafter, exemplary embodiments of a spiral wound type filter cartridge according to the present invention will be described with reference to the annexed drawings in more detail. A detailed explanation of the prior arts related to the description of the present invention is omitted for a clear understanding of the principle of the present invention.

The present invention is directed to a spiral wound type filter cartridge constituting a filter for purifying water.

The spiral wound type filter cartridge comprises: a filter tube 100 including a purified water outlet 120; a filtering sheet 200 composed of a membrane sheet 220 provided with a mesh sheet 224 for membrane and a mesh sheet 240, serves to guide and purify raw water through a channel and is wound in the form of a roll on the filter tube 100; an activated carbon fiber 300 provided in the channel formed by the filtering sheet 200; and an adhesive sheet 400 to allow the filtering sheet 200 to maintain a circular appearance, while wound on the filter tube 120.

The filter tube 100 is in the form of a pipe such that the purified-water outlet 120 is open at one side thereof and comprises a plurality of purified-water inlet holes 140 arranged in a longitudinal direction on the outside thereof, to allow purified-water to be introduced through the purified-water inlet holes 140 and then discharged through the purified-water outlet 120.

The filtering sheet 200 comprises the membrane sheet 220, and the mesh sheet 240 closely adhered to one or both sides of the membrane sheet 220, and is repeatedly wound in a screw direction, while the one side of the membrane sheet 220 and the one side of the mesh sheet 240 are fixed on the one side of the filter tube 100.

That is, the filtering sheet 200 is repeatedly wound in the form of a roll cake, while the one side thereof is fixed on the filter tube 100.

The membrane sheet 220 is composed of a two-fold sheet to provide a filter area 222 therein and the filter area 222 is provided with a mesh sheet for membrane 224.

The preferable activated carbon fiber 300 is in the form of a felt, paper or non-woven fabric, or made by weaving woofs and warps together, and the activated carbon fiber 300 is preferably adhered to the mesh sheet for membrane 224 or the mesh sheet 240. Also, the activated carbon fiber 300 is preferably added in the form of a sheet on one or both sides of the mesh sheet for membrane 224 or the mesh sheet 240.

The activated carbon fiber 300 may be provided for one or both of the mesh sheet for membrane 224 provided in the membrane sheet 220 constituting the filtering sheet 200, and the mesh sheet 240, depending on water purification conditions. At this time, the shapes of the activated carbon fiber 300 may be identical or different.

That is, the activated carbon fiber 300 is integrally bonded to the mesh sheet for membrane 224 or the mesh sheet 240, or is made of an activated carbon fiber sheet 320, thus being provided on one or both sides of the mesh sheet for membrane 224 or the mesh sheet 240. Furthermore, both the bonding and sheet-type addition may be applied.

The activated carbon fiber sheet 320 may be selected from those made by binding fiber yarns in the form of a felt, paper or non-woven fabric or made by weaving woofs and warps together.

The activated carbon fiber 300 may have a specific surface area of 500 to 3,000 $m^2/g$.

In addition, if necessary, various functional substances may be introduced as additives to impart various functions to the surface or inside of the activated carbon fiber sheet 320. That is, the functions may be imparted by coating additives on the surface of the activated carbon fiber sheet 320 or impregnating the same therein for homogeneous dispersion.

The present invention is not particularly limited with regard to the additives. Specifically, the additives may be selected from the group consisting of germicides, antibacterials, mineral agents, pH adjusters and combinations thereof so long as they not deteriorate the functions of the activated carbon fiber sheet 320.

The additives may be selected by those skilled in the art so as to suit the apparatus or field to which the filter cartridge according to the present invention is applied. For example, an antibacterial may be coated on the activated carbon fiber sheet 320 or impregnated therein to impart sterilizing and antibacterial actions thereto.

Any antibacterial may be used without particular limitation so long as it is well-known in the art. For example, the antibacterial may be selected from the group consisting of nanosilver, vitamin C, kitosan powders and combinations thereof. In particular, nano-silver is known to have superior antibacterial activity. Nano-silver exhibits superior antibacterial activity to various bacteria, viruses and the like. More specifically, in the case where nano-silver is introduced into the activated carbon fiber sheet 320, an area where the activated carbon fiber sheet 320 is present is in contact with purified and filtered water, thus allowing the nano-silver to impart antibacterial activity to the final purified and filtered water and maintaining the antibacterial activity of the water.

In addition to the antibacterial or separately therefrom, a mineral agent or pH adjuster is coated on the activated carbon fiber sheet 320 or impregnated therein to provide mineral water, or alkaline or acid water through the control of pH.

The mineral agent and pH adjuster may be used without particular limitation so long as they are known in the art. Examples of useful mineral agents and pH adjusters include elvan, tourmarine, zeolite, germanium, illite and the like. These ceramics are silicate minerals including alkalis such as sodium, potassium, calcium, magnesium and the like. The alkali reacts with water in contact with the activated carbon fiber sheet to provide alkaline or mineral active water.

For example, one calcium molecule reacts with two water molecules to form calcium hydroxide, as depicted in the following Reaction Scheme. In this process, a portion of electrons derived from calcium is used for formation of hydrogen gas and the remaining electrons are present in the water and induce formation of hydroxyl groups. As a result, an increase in hydroxyl groups (OH—) formed from the reaction of calcium and water induces an increase in pH, and the water becomes alkaline reduced water and, at the same time, mineral active water in which the calcium ions ($Ca^{2+}$) are dissolved.

$$Ca+2H_2O \rightarrow Ca(OH)_2+H_2(=2H+2e^-)\uparrow \rightarrow Ca^{2+}+2OH^-+H_2\uparrow$$

Accordingly, without purchasing an additional alkaline reduced water supply device, alkaline reduced water or mineral active water can be obtained by introducing mineral agents or pH adjusters into the activated carbon fiber sheet 320.

When these additives are applied to the activated carbon fiber sheet 320, they are used such that they do not clog the pores of the activated carbon fiber sheet 320 and do not impair physical properties. The content of the additives is suitably determined while taking into consideration the desired effects, and physical and economical properties of the activated carbon fiber sheet 320. Preferably, the additives are used in an amount of not more than 30 parts by weight, with respect to 100 parts by weight of the activated carbon fiber sheet 320.

The adhesive sheet 400 is an element in which an adhesive is applied onto one side thereof, and is adhered to the filtering sheet 200 such that the filtering sheet 200 takes the circular housing appearance, while being wound on the filter tube 100.

In addition, the activated carbon fiber 300 is determined depending on the contact time of introduced water, the density of activated carbon fiber, the amount of the activated carbon fiber and the amount of water passing through the activated carbon fiber, and the activated carbon fiber 300 may thus be manufactured in the form of a felt, non-woven fabric, paper, sheet or woven fabric.

In addition, the spiral wound type filter cartridge may be provided with an activated carbon 500 in the entire inside of the filter tube 100 or in a predetermined area of the purified water outlet 120. The activated carbon 500 may be integrally joined to the filter tube by filling a felt, non-woven fabric or paper shape of activated carbon fiber, or particle- or block-type activated carbon therein. The block activated carbon may be prepared from activated carbon fiber or particulate activated carbon.

The activated carbon fiber may be further introduced into one or all of the mesh sheet for membrane 224 and the mesh sheet 240. The activated carbon fiber may be integrally formed with the mesh sheet for membrane 224 or the mesh sheet 240 in the form of a felt, non-woven or paper or be provided in the form of a sheet on one or both surfaces thereof. In this case, the germicide, antibacterial, mineral agent, pH adjuster and a combination thereof may also be applied to the activated carbon fiber sheet.

As mentioned above, the present invention provides a filter cartridge provided with a spiral shape of activated carbon fiber, thus allowing inside of the filter cartridge to serve as a carbon filter and eliminating the necessity of using any carbon filter for the pre- or post treatment process upon purifying water. As a result, the efficiency with which the activated carbon fiber contacts treatment water increases, thus increasing the efficiency of activated carbon, functionality is imparted to the activated carbon fiber, thus preventing biological contamination and deterioration in physical properties of filter media (such as ultrafiltration, nanofiltration or reverse osmosis membranes) by organic compounds, due to antibacterial and sterilization activities of the filter media. Furthermore, polyamide composite membranes are used as the filter media to prevent deterioration in durability which may be caused by chlorine residues, thus decreasing the overall size of water purifiers and considerably reducing costs associated therewith.

Figure 6:
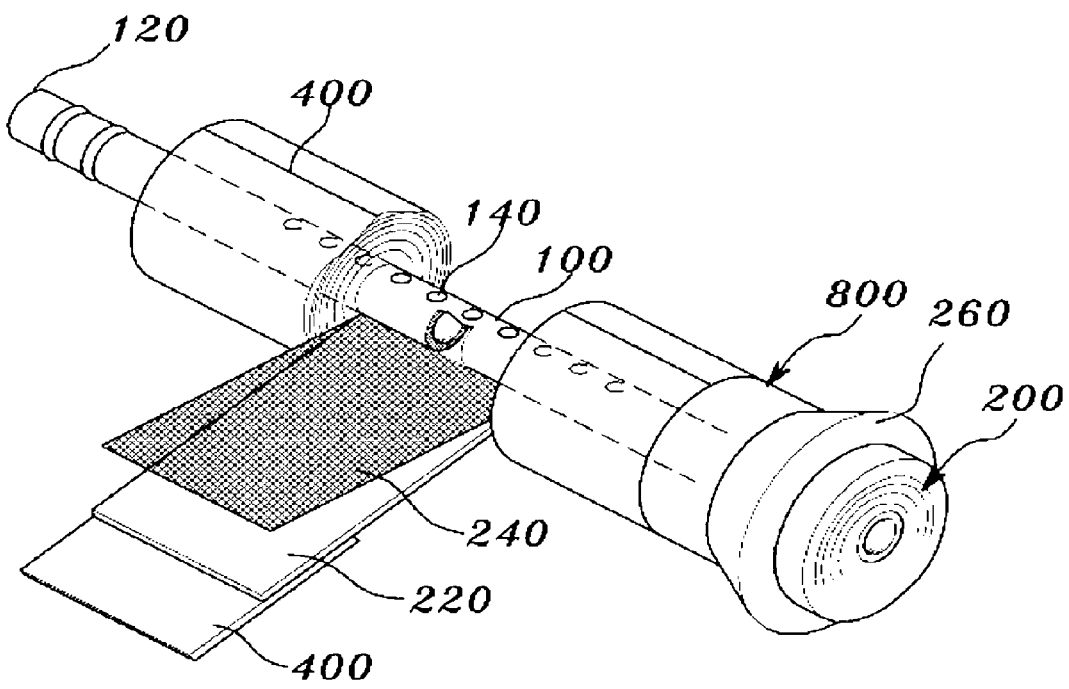
FIG. 6 is an exploded perspective view illustrating a principal part of a membrane sheet according to another embodiment of the present invention.
Figure 7:
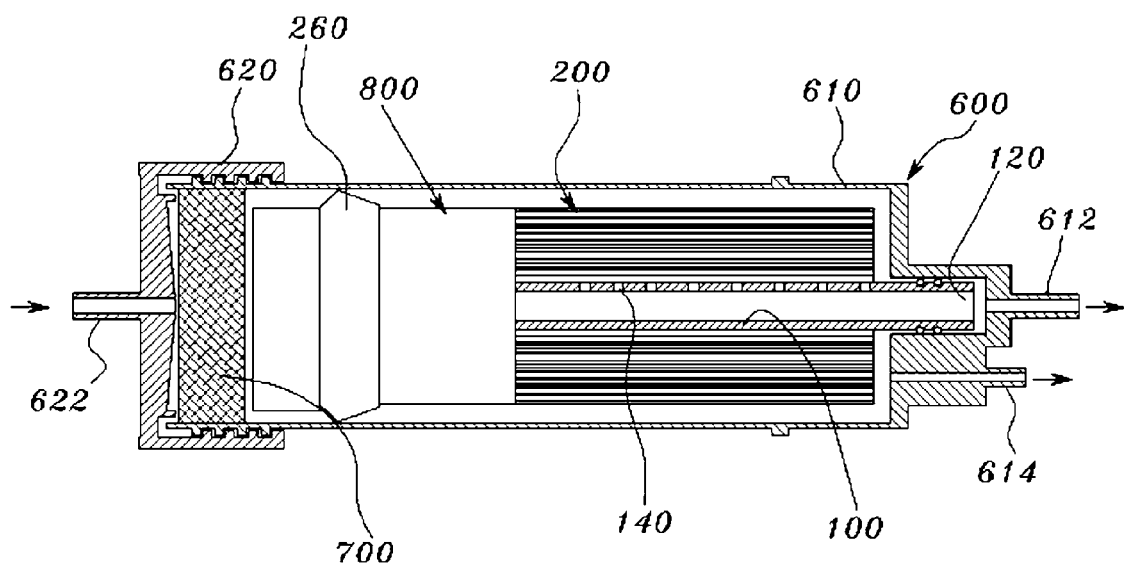
FIG. 7 is a sectional view illustrating a state wherein the housing body of FIG. 6 is applied to a filter case.

In addition, FIGS. 6 and 7 illustrate another embodiment of the present invention. As shown in FIGS. 6 and 7, the filter tube 100 and the filtering sheet 200 constitute a housing body 800 taking a circular housing appearance through the adhesive sheet 400 and are thus arranged in a filter case 600.

The filter case 600 comprises a body 610 which is joined to the housing body 800 such it covers the housing body 800 and is provided with a purified-water outlet hole 612 in the rear thereof, to allow purified water to be discharged, while passing through the housing body 800, and a cover 620 joined to the front of the body 610 and provided with raw water inlet holes 622.

A filter block 700 is further provided between an area present in the inside front of the filter case 600 and an area present in the front of the housing body 800, to allow introduced raw water to be primarily filtered through the filter block 700 and then secondarily filtered through the housing body 800.

The filter block 700 serves to filter raw water, which may be composed of various materials such as activated carbon fibers. Representatively, the filter block may take a felt, non-woven fabric, paper or cut-shape. The filter block material may be activated carbon fiber, or particulate or block activated carbon, and the present invention is not limited thereto.

In addition, an outlet hole 614 is further provided on the rear circumferential surface of the body 610 constituting the filter case 600, to allow the raw water to be filtered through the filter block 700 and then to be immediately discharged. Accordingly, the final water is suitable for use as living water.

Hereinafter, a process for assembling the spiral wound type filter cartridge and a process for purifying water using the same will be described in detail.

Upon assembly, first, the membrane sheet 220 provided with the mesh sheet for membrane 224 is folded in half and a mesh sheet 240 is laminated on one or both sides thereof, to constitute a filtering sheet 200. Then, one side of the mesh sheet 240 is fixed on the one side of the filter tube 100, an adhesive is applied to the edge thereof and the filtering sheet 200 is wound in the form of a roll. Subsequently, the adhesive sheet 400 is adhered to one end of the filtering sheet 200 to form the housing body 800 taking a circular appearance.

Then, the housing body 800 is inserted through a packing 260 into the filter case 600 provided with raw water inlet holes 622 and a purified-water outlet hole 612, the purified water outlet 120 of the filter tube 100 is closely joined to the purified-water outlet hole 612 through a means such as an O-ring such that they communicate with each other, and the filter case 600 is installed in a water purifier, to complete assembly.

Then, when a water purifier is operated, after being introduced through the raw water inlet holes 622 of the filter case 600, raw water is primarily filtered through the filter block 700 and then secondarily wound in the form of a roll, and foreign materials are filtered, while passing through the channel provided by the mesh sheet for membrane 224 and the mesh sheet 240 inside the membrane sheet 220 constituting the filtering sheet 200. Simultaneously, the raw water is filtered, while passing through the activated carbon fiber 300 arranged depending on water purification conditions, and is purified through the purified water inlet holes 140 and the purified water outlet hole 120 formed on the filter tube 100 and then discharged through the purified water outlet hole 612.

MODE FOR THE INVENTION

Hereinafter, preferred examples will be provided for a further understanding of the invention. The following Examples and Comparative Examples are for illustrative purposes only and are not intended to limit the scope of the present invention.

Example 1

Figure 5:
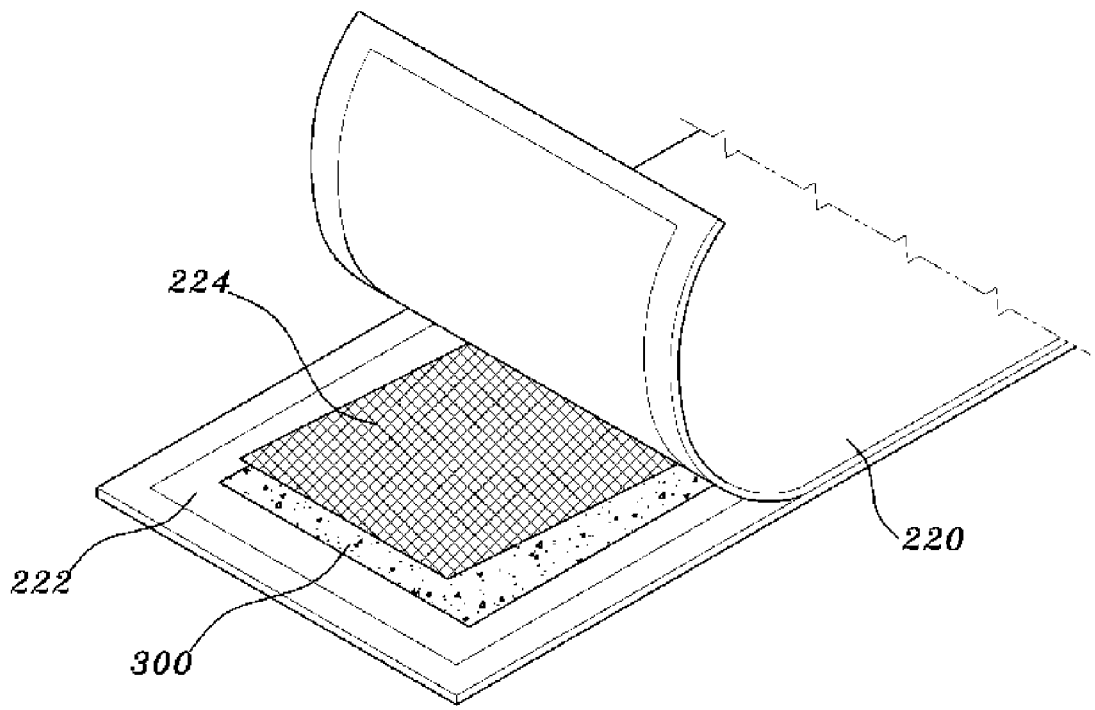
FIG. 5 is an exploded perspective view illustrating a membrane sheet according to another embodiment of the present invention.

As shown in FIG. 5, a spiral wound type filter cartridge was manufactured from sheets made of activated carbon fiber. More specifically, the filter cartridge was manufactured by applying an activated carbon fiber sheet to the mesh sheet for membrane. 5 tons of water was introduced into the spiral wound type filter cartridge thus manufactured and a chlorine-residue removal ratio was measured. The results thus obtained are shown in FIG. 8.

Figure 8:
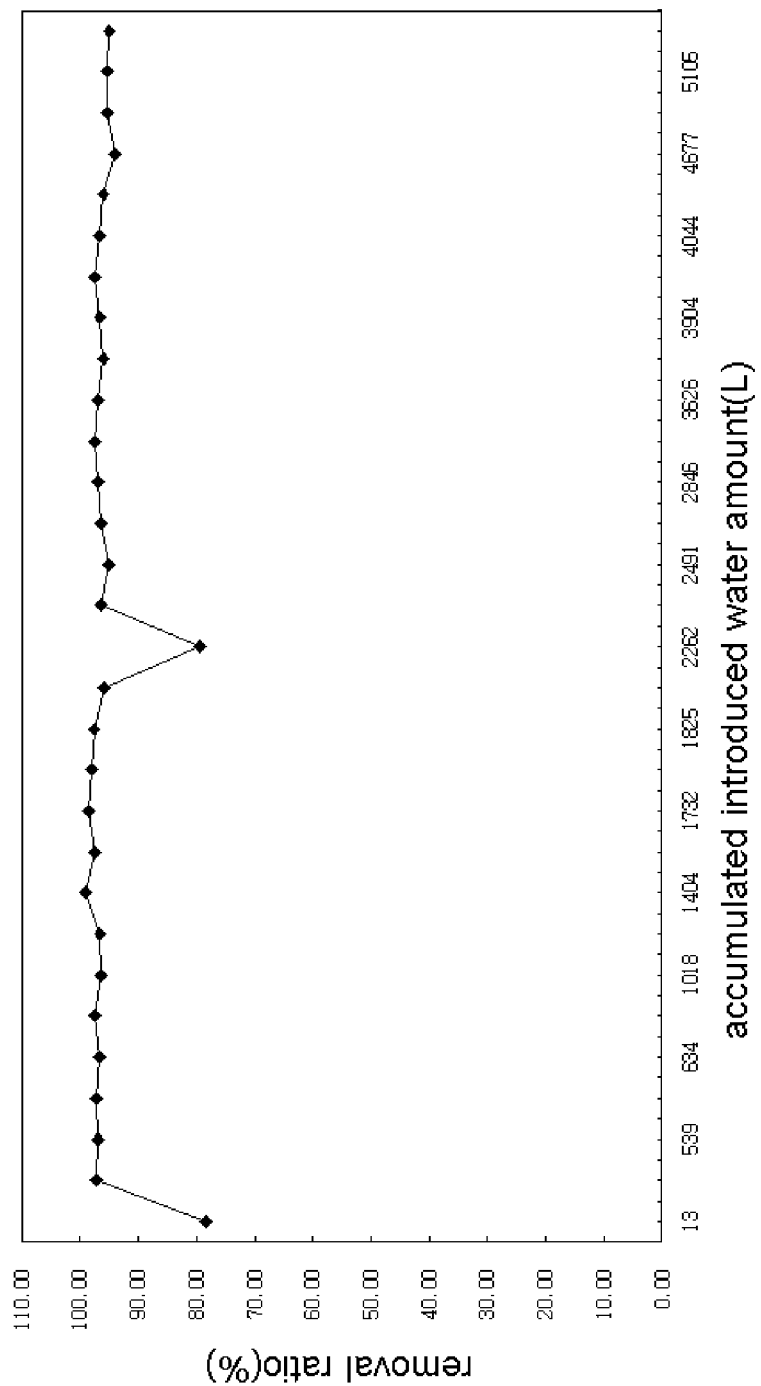
FIG. 8 is a graph showing a chlorine residue removal ratio as a function of purified water, for the spiral wound type filter cartridge provided with the activated carbon fiber sheet and the mesh sheet for membrane.

FIG. 8 is a graph showing a chlorine-residue removal ratio as a function of water to be purified, for the spiral wound type filter cartridge provided with the activated carbon fiber sheet and the mesh sheet for membrane.

As shown in FIG. 8, the chlorine residue removal performance is good even at an initial water purification stage and stays at about 95% or higher until the 5 tons of water is completely purified. This behavior corresponds to the water flow direction and increases water treatment contact efficiency of the activated carbon fiber.

Although the preferred embodiments of the spiral wound type filter cartridge according to the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applied to a water purifier filter.

The invention claimed is:

1. A spiral wound type filter cartridge, comprising:
    a filter tube provided with a purified-water outlet on one side thereof, the filter tube provided with a plurality of purified-water inlet holes in a longitudinal direction on the outside thereof, the filter tube being in the form of a pipe;
    a filtering sheet comprising a membrane sheet composed of a two-fold sheet to provide a filter area therein and provided with a mesh sheet for membrane, and a mesh sheet provided with a channel and laminated on one or both surfaces of the membrane sheet, the filtering sheet being repeatedly wound on the filter tube in the form of a roll, while being fixed on the one side of the filter tube;
    an activated carbon fiber provided in the mesh sheet; and
    an adhesive sheet adhered to the filtering sheet such that the filtering sheet takes the circular housing appearance, while being wound on the filter tube.

2. A spiral wound type filter cartridge comprising:
    a filter tube provided with a purified-water outlet on one side thereof, the filter tube being provided with a plurality of purified-water inlet holes in a longitudinal direction on the outside thereof, the filter tube being in the form of a pipe;
    a filtering sheet comprising a membrane sheet composed of a two-fold sheet to provide a filter area therein and provided with a mesh sheet for membrane, and a mesh sheet provided with a channel and laminated on one or both surfaces of the membrane sheet, the filtering sheet being repeatedly wound on the filter tube in the form of a roll, while being fixed on the one side of the filter tube;
    an activated carbon fiber provided in the mesh sheet for membrane; and
    an adhesive sheet adhered to the filtering sheet such that the filtering sheet takes the circular housing appearance, while being wound on the filter tube.

3. A spiral wound type filter cartridge comprising:
    a filter tube provided with a purified-water outlet on one side thereof, the filter tube provided with a plurality of purified-water inlet holes in a longitudinal direction on the outside thereof, the filter tube being in the form of a pipe;
    a filtering sheet comprising a membrane sheet composed of a two-fold sheet to provide a filter area therein and provided with a mesh sheet for membrane, and a mesh sheet provided with a channel and laminated on one or both surfaces of the membrane sheet, the filtering sheet being repeatedly wound on the filter tube in the form of a roll, while being fixed on the one side of the filter tube;
    an activated carbon fiber provided both in the mesh sheet and in the mesh sheet for membrane; and
    an adhesive sheet adhered to the filtering sheet such that the filtering sheet takes the circular housing appearance, while being wound on the filter tube.

4. The spiral wound type filter cartridge according to claim 1, wherein the activated carbon fiber is in the form of a felt, paper or non-woven fabric and is integrally bonded to the mesh sheet for membrane or the mesh sheet.

5. The spiral wound type filter cartridge according to claim 1, wherein the activated carbon fiber is composed of an activated carbon fiber sheet and is provided in one or both surfaces of the mesh sheet for membrane or the mesh sheet.

6. The spiral wound type filter cartridge according to claim 5, wherein the activated carbon fiber sheet is woven with activated carbon fiber.

7. The spiral wound type filter cartridge according to claim 6, wherein the surface or inside of the activated carbon fiber sheet is coated or impregnated with an additive.

8. The spiral wound type filter cartridge according to claim 7, wherein the additive is selected from the group consisting of germicides, antibacterials, mineral agents, pH adjusters and combinations thereof.

9. The spiral wound type filter cartridge according to claim 7, wherein the additive is present in an amount not more than 30 parts by weight, with respect to 100 parts by weight of the activated carbon fiber sheet.

10. The spiral wound type filter cartridge according to claim 1, wherein the filter tube and the filtering sheet constitute a housing body taking a circular housing appearance through the adhesive sheet and are arranged in a filter case,
wherein the filter case comprises:
a body joined to the housing body so as to cover the housing body, the body being provided with a purified-water outlet hole in the rear thereof, to allow purified water to be discharged, while passing through the housing body; and
a cover joined in the front of the body and provided with a raw water inlet hole.

11. The spiral wound type filter cartridge according to claim 10, wherein the filter cartridge further comprises:
a filter block provided between an area present in the inside front of the filter case and an area present in the front of the housing body filter case.

12. The spiral wound type filter cartridge according to claim 11, wherein the filter block comprises a felt, non-woven fabric, paper or cut shape of activated carbon fiber, or particulate or block activated carbon.

13. The spiral wound type filter cartridge according to claim 11, wherein one or more outlet holes are further provided on the rear circumferential surface of the body constituting the filter case.

14. The spiral wound type filter cartridge according to claim 2, wherein the activated carbon fiber is in the form of a felt, paper or non-woven fabric and is integrally bonded to the mesh sheet for membrane or the mesh sheet.

15. The spiral wound type filter cartridge according to claim 2, wherein the activated carbon fiber is composed of an activated carbon fiber sheet and is provided in one or both surfaces of the mesh sheet for membrane or the mesh sheet.

16. The spiral wound type filter cartridge according to claim 15, wherein the activated carbon fiber sheet is woven with activated carbon fiber.

17. The spiral wound type filter cartridge according to claim 16, wherein the surface or inside of the activated carbon fiber sheet is coated or impregnated with an additive.

18. The spiral wound type filter cartridge according to claim 17, wherein the additive is selected from the group consisting of germicides, antibacterials, mineral agents, pH adjusters and combinations thereof.

19. The spiral wound type filter cartridge according to claim 17, wherein the additive is present in an amount not more than 30 parts by weight, with respect to 100 parts by weight of the activated carbon fiber sheet.

20. The spiral wound type filter cartridge according to claim 3, wherein the activated carbon fiber is in the form of a felt, paper or non-woven fabric and is integrally bonded to the mesh sheet for membrane or the mesh sheet.

21. The spiral wound type filter cartridge according to claim 3, wherein the activated carbon fiber is composed of an activated carbon fiber sheet and is provided in one or both surfaces of the mesh sheet for membrane or the mesh sheet.

22. The spiral wound type filter cartridge according to claim 21, wherein the activated carbon fiber sheet is woven with activated carbon fiber.

23. The spiral wound type filter cartridge according to claim 22, wherein the surface or inside of the activated carbon fiber sheet is coated or impregnated with an additive.

24. The spiral wound type filter cartridge according to claim 23, wherein the additive is selected from the group consisting of germicides, antibacterials, mineral agents, pH adjusters and combinations thereof.

25. The spiral wound type filter cartridge according to claim 23, wherein the additive is present in an amount not more than 30 parts by weight, with respect to 100 parts by weight of the activated carbon fiber sheet.

26. The spiral wound type filter cartridge according to claim 2, wherein the filter tube and the filtering sheet constitute a housing body taking a circular housing appearance through the adhesive sheet and are arranged in a filter case,
wherein the filter case comprises:
a body joined to the housing body so as to cover the housing body, the body being provided with a purified-water outlet hole in the rear thereof, to allow purified water to be discharged, while passing through the housing body; and
a cover joined in the front of the body and provided with a raw water inlet hole.

27. The spiral wound type filter cartridge according to claim 26, wherein the filter cartridge further comprises:
a filter block provided between an area present in the inside front of the filter case and an area present in the front of the housing body filter case.

28. The spiral wound type filter cartridge according to claim 27, wherein the filter block comprises a felt, non-woven fabric, paper or cut shape of activated carbon fiber, or particulate or block activated carbon.

29. The spiral wound type filter cartridge according to claim 27, wherein one or more outlet holes are further provided on the rear circumferential surface of the body constituting the filter case.

30. The spiral wound type filter cartridge according to claim 3, wherein the filter tube and the filtering sheet constitute a housing body taking a circular housing appearance through the adhesive sheet and are arranged in a filter case,
wherein the filter case comprises:
a body joined to the housing body so as to cover the housing body, the body being provided with a purified-water outlet hole in the rear thereof, to allow purified water to be discharged, while passing through the housing body; and
a cover joined in the front of the body and provided with a raw water inlet hole.

31. The spiral wound type filter cartridge according to claim 30, wherein the filter cartridge further comprises:
a filter block provided between an area present in the inside front of the filter case and an area present in the front of the housing body filter case.

32. The spiral wound type filter cartridge according to claim 31, wherein the filter block comprises a felt, non-woven fabric, paper or cut shape of activated carbon fiber, or particulate or block activated carbon.

33. The spiral wound type filter cartridge according to claim 31, wherein one or more outlet holes are further provided on the rear circumferential surface of the body constituting the filter case.

* * * * *